(12) United States Patent
Malcolmson et al.

(10) Patent No.: US 9,553,319 B2
(45) Date of Patent: Jan. 24, 2017

(54) HIGH WATER-CONTENT MEMBRANES

(75) Inventors: Ryan Malcolmson, South Yorkshire (GB); Daniel Greenhalgh, South Yorkshire (GB)

(73) Assignee: ITM POWER (RESEARCH) LIMITED, South Yorkshire (GB)

( * ) Notice: Subject to any disclaimer, the term of this patent is extended or adjusted under 35 U.S.C. 154(b) by 156 days.

(21) Appl. No.: 14/122,831

(22) PCT Filed: Jun. 1, 2012

(86) PCT No.: PCT/GB2012/051260
§ 371 (c)(1),
(2), (4) Date: Jan. 22, 2014

(87) PCT Pub. No.: WO2012/164313
PCT Pub. Date: Dec. 6, 2012

(65) Prior Publication Data
US 2014/0134517 A1 May 15, 2014

(30) Foreign Application Priority Data
Jun. 2, 2011 (GB) .................................. 1109281.4

(51) Int. Cl.
*H01M 8/02* (2016.01)
*H01M 8/10* (2016.01)

(52) U.S. Cl.
CPC ......... *H01M 8/0291* (2013.01); *H01M 8/0289* (2013.01); *H01M 8/106* (2013.01);
(Continued)

(58) Field of Classification Search
CPC .. H01M 8/1023; H01M 8/1048; H01M 8/106; H01M 8/0291; H01M 8/1072; H01M 2300/0082; H01M 2300/0091; Y02E 60/521
See application file for complete search history.

(56) References Cited

U.S. PATENT DOCUMENTS

| 4,620,954 A | 11/1986 | Singer et al. |
| 2003/0060521 A1 | 3/2003 | Fisher |

(Continued)

FOREIGN PATENT DOCUMENTS

| CN | 1697217 A | 11/2005 |
| CN | 1985396 A | 6/2007 |

(Continued)

OTHER PUBLICATIONS

English translation of Notice of Reasons for Rejection, issued Dec. 8, 2014, in corresponding Japanese Application No. 2014-513256.
(Continued)

*Primary Examiner* — Brittany Raymond
(74) *Attorney, Agent, or Firm* — Saliwanchik, Lloyd & Eisenschenk

(57) ABSTRACT

The present invention is a hydrophilic polymer, which can be hydrated to form a hydrated hydrophilic polymer having a water content of at least 65%, wherein water content is defined as [(mass of the hydrated hydrophilic polymer−mass of the dry hydrophilic polymer)/mass of the hydrated hydrophilic polymer]×100. The hydrophilic polymer may be hydrated to form a hydrated hydrophilic polymer having a water content of at least 65%. The present invention also 10 provides MEAs and electrochemical cells and methods of forming same.

21 Claims, 1 Drawing Sheet

Monolithic membrane

(52) U.S. Cl.
CPC ....... *H01M 8/1023* (2013.01); *H01M 8/1048* (2013.01); *H01M 8/1072* (2013.01); *H01M 2300/0082* (2013.01); *H01M 2300/0091* (2013.01); *Y02E 60/521* (2013.01); *Y02P 70/56* (2015.11)

(56) References Cited

U.S. PATENT DOCUMENTS

| | | | |
|---|---|---|---|
| 2003/0113603 A1* | 6/2003 | Highgate | B01D 67/0006 429/483 |
| 2010/0029789 A1 | 2/2010 | Chen et al. | |
| 2010/0056650 A1 | 3/2010 | Highgate | |

FOREIGN PATENT DOCUMENTS

| | | |
|---|---|---|
| EP | 0182659 | 5/1986 |
| WO | WO 03/023890 A2 | 3/2003 |
| WO | WO 2005-124915 * | 12/2005 |
| WO | WO 2005/124915 A1 | 12/2005 |
| WO | WO 2011/051720 A1 | 5/2011 |

OTHER PUBLICATIONS

Office Action issued Jul. 17, 2015, in corresponding Chinese Application No. 201280026954.9.
Examination Report issued Jun. 1, 2016, in corresponding New Zealand Application No. 618077.
Kambiz Farbod, "UV and spontaneously cured polyethylene glycol-based hydrogels for soft and hard tissue scaffolds", Stockholm, 2010.

* cited by examiner

Monolithic membrane

Composite membrane

HIGH WATER-CONTENT MEMBRANES

CROSS REFERENCE TO A RELATED APPLICATION

This application is a National Stage Application of International Application Number PCT/GB2012/051260, filed Jun. 1, 2012, which claims priority to Great Britain Application No. 1109281.4, filed Jun. 2, 2011, both of which are incorporated herein by reference in their entirety.

FIELD OF THE INVENTION

The present invention relates to hydrophilic polymers, and their use in membrane electrode assemblies, for use in fuel cells.

BACKGROUND OF THE INVENTION

Hydrophilic polymers for use in membrane electrode assemblies are disclosed in WO2003/023890. That publication describes how hydrophilic polymers can be obtained from the polymerisation of a hydrophobic monomer, a hydrophilic monomer, a monomer including a strongly ionic group and water.

The polymers disclosed in WO2003/023890 have excellent ionic properties, and are less susceptible to dehydration, in use, than non-hydrophilic membranes such as Nafion®. That publication describes, as a preferred embodiment, that the hydrophilic polymer should have a water uptake of no more than 85%. This is equivalent to a water content of approximately 35%. This is because it was believed that polymers with a higher water uptake than this, would be too unstable for use in an MEA. Water uptake is defined therein as [(hydrated mass–dry mass)/dry mass]×100.

The Examples in WO2003/023890 disclose MEAs (Membrane Electrode Assemblies), wherein the polymer has been further expanded by soaking in water. Due to the composition of those polymers, and also because they are polymerised onto a reinforcing material none of the final polymers in the MEAs have a water content of greater than 60%.

The water uptake of a hydrophilic polymer membrane is often restricted by polymerising the membrane onto a porous support structure, such as polythene. This prohibits the polymer from expanding too much, and therefore becoming too unstable. It also ensures that the anionic/cationic sites are dense, i.e. that the membrane has an intrinsically high acid site concentration, [H$^+$]. This was believed to be necessary for the ionic performance of the membrane.

SUMMARY OF THE INVENTION

It has surprisingly been found that certain hydrophilic polymers can be formed with a very high water content. These polymers have a surprisingly high protonic mobility, while still being sufficiently stable for use in a fuel cell. It has been discovered that lower [H$^+$] caused by the high water content is offset by the high protonic mobility, so that membranes with excellent ionic properties, and very high power densities, are achieved. The final membrane may be supported or unsupported, and in both cases excellent properties result.

According to a first aspect of the present invention, a hydrophilic polymer is provided, which can be hydrated to form a hydrated hydrophilic polymer having a water content of at least 65%, wherein water content is defined as [(mass of the hydrated hydrophilic polymer–mass of the dry hydrophilic polymer)/mass of the hydrated hydrophilic polymer]×100.

According to a second aspect, a hydrated hydrophilic polymer has a water content of at least 65%, wherein water content is as defined above.

According to a third aspect, an MEA comprises a hydrophilic polymer or a hydrated hydrophilic polymer as defined above.

According to a fourth aspect, a method of forming an MEA as defined above, comprises introducing the materials from which the membrane is to be formed in between the electrodes, and polymerising the membrane in situ.

According to a fifth aspect, an MEA as defined above is used in an electrochemical cell.

According to a sixth aspect, an electrochemical cell comprises an MEA as defined above.

DESCRIPTION OF THE PREFERRED EMBODIMENTS

Figure 1:
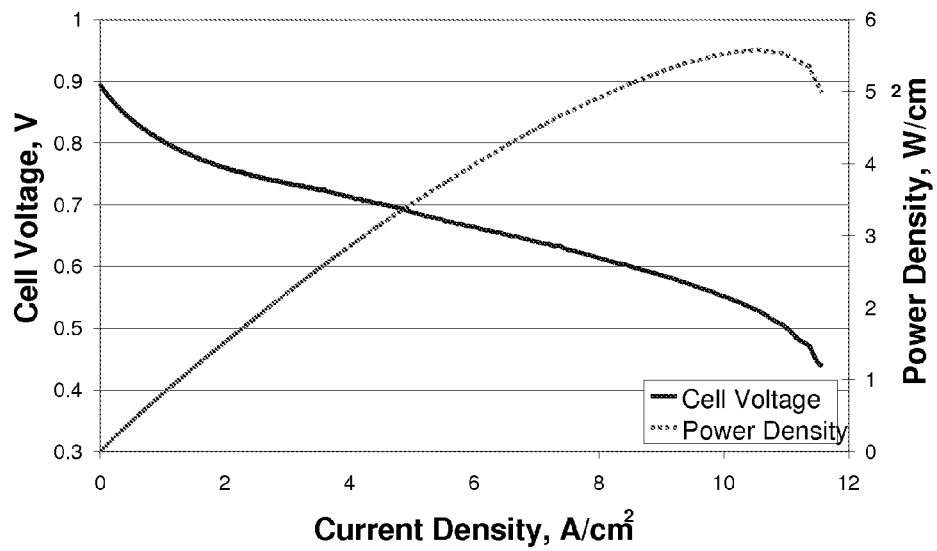
FIGS. 1 and 2 show the performance of a monolithic (unsupported) and composite (supported) MEA according to the invention.

The term "hydrophilic polymer" is known in the art. Preferably, it is defined as a polymer, which is water-soluble in its non cross-linked form. When a hydrophilic polymer is cross-linked, it may no longer be water-soluble, but it is still classed as a hydrophilic polymer. Usually, it will swell in water.

As defined herein, the term water content is defined as [(mass of the hydrated hydrophilic polymer–mass of the dry hydrophilic polymer)/mass of the hydrated hydrophilic polymer]×100. The skilled person is familiar with the term "water content" and how to measure it, but preferably, to measure the mass of the "dry" hydrophilic polymer, the polymer is heated or dried under vacuum, such that virtually all water is removed from the polymer. Preferably, the mass is measured at room temperature, i.e. 22° C. and atmospheric pressure, i.e. 1 atm, as there may be small variations in water content depending on the environmental conditions.

The above paragraph explains how water content may be measured. The present invention also covers hydrated forms of the hydrophilic polymers of the invention. This hydration may be carried out by any suitable method, i.e. using water or acid, and at any desired temperature. Examples are given below.

The hydrophilic polymers of the invention are based on those described in WO03/023890, the contents of which are incorporated herein by reference. The difference between those hydrophilic polymers and the hydrophilic polymers now claimed is that the polymers of the present invention are able to expand and absorb water until the water content of the polymer is greater than 65% by weight of the expanded polymer. Without wishing to be bound by theory, this high water-uptake ability may be down to the concentration or strength of the acid incorporated into the polymer membrane, or by the amount of cross-linker, if present, incorporated into the membrane.

The polymer may be cured onto a reinforcement material, i.e. a material which restricts water uptake, in which case it is referred to herein as a "supported membrane" or as a "composite membrane". Alternatively, it may not be fixed to any substrate, i.e. it is allowed to expand and move freely with respect to its surroundings, in which case it is referred to herein as an "unsupported membrane" or a "monolithic membrane" or as a "neat membrane".

Preferably the water content is greater than 70%, 75%, 80%, 85%, 90%, 95%, 97%, 98% or 99%, wherein water content is as defined above.

In a preferred embodiment, a polymer of the invention is formed by the polymerisation of one of more monomers dissolved in water, more preferably by the polymerisation of a hydrophilic monomer, a hydrophobic monomer, and a strongly ionic component, all dissolved in water to form a homogeneous mixture.

Preferred hydrophobic monomers are methyl methacrylate (MMA), acrylonitrile (AN), methacryloxypropyltris(trimethylsiloxy)silane (TRIS) and 2,2,2-trifluoroethyl methacrylate (TRIF).

Preferred hydrophilic monomers are methacrylic acid (MA), 2-hydroxyethyl methacrylate (HEMA), ethyl acrylate (EA), 1-vinyl-2-pyrrolidinone (VP), propenoic acid 2-methyl ester (PAM), monomethacryloyloxyethyl phthalate (EMP) and ammonium sulphatoethyl methacrylate (SEM).

Preferably, the hydrophobic component and/or the hydrophilic component is present in an amount of 25-35% by weight of the polymerisation mixture. Alternatively, the hydrophilic component and/or the hydrophilic component is present in an amount of 10-20% by weight of the polymerisation mixture. Preferably, the amounts of 25-35% are with respect to a monolithic, ie. unsupported membrane. Preferably, the amounts of 10-20% are with respect to a composite, ie. supported membrane.

Preferably, the ionic component is selected from toluenesulphonic acid (TSA), 1-methyl-1-benzimidazole-2-sulphonic acid, isethionic acid, Na salt, 1-hexanesulphonic acid, Na salt, hydroxylene-O-sulphonic acid, 2-acrylamido-2-methyl-1-propanesulphonic acid (AMPSA), vinylsulphonic acid (VSA), styrenesulphonic acid (SSA), 2-sulphoethyl methacrylate (SOMA) and 3-sulphopropyl methacrylate, Na salt (SPM). Salt versions of those acids, e.g. the sodium salt, are also suitable for use as ionic components.

Preferably, the ionic component is a strongly ionic component. More preferably a strong acid or a monomer derived from a strong acid, or salts thereof. The term "strong acid" is well known in the art. It means an acid, which is virtually 100% ionised in solution. Preferably, a strong acid is one with a pKa value has to be less than that of a hydronium ion ($H_3O^+$), i.e. less than −1.74.

More preferably, the ionic component is the salt form of a strong acid. Examples include isethionic acid, Na salt, 1-hexanesulphonic acid, Na salt, hydroxylene-O-sulphonic acid, 3-sulphopropyl methacrylate, Na salt (SPM).

Preferably, a polymer of the invention is cross-linked. In that case, the polymerisation mixture should include a cross-linker, such as allyl methacrylate.

If the polymer of the invention is cross-linked, then it is preferable for the cross-linker to be present in an amount of less than 5% by weight (of the polymerisation mixture). More preferably, the cross-linker is present in an amount of less than 4%, 3%, 2% or 1% by weight.

Preferably, a mixture to be polymerised (in order to form a polymer of the invention) includes an initiator, for example a UV initiator.

In a preferred embodiment, a method of forming a polymer comprises the polymerisation of a homogenous solution of hydrophobic and hydrophilic monomers and an ionic component, in water, wherein the ionic component is present in an amount of at least 20% by weight, preferably at least 25%, 30%, 35%, 40% or 45% by weight.

Achieving hydrophilic polymers with the required water content is possible by adjusting the amounts of the components to be polymerised, although there may be other ways to achieve the high water content. It was surprising to find polymers with such high water content as those described therein, were able to function in an MEA.

The strongly ionic component is preferably present in an amount of at least 20% by weight. Preferably, it is present in an amount of at least 25%, 30%, 35%, 40% or 45% by weight.

The water should be present in an amount of at least 10% by weight. Preferably, it is present in an amount of at least 15%, 20%, 25%, 30%, 35%, 40% or 45% by weight.

When the membrane is supported (i.e. attached to a substrate that restricts water uptake and expansion of the membrane), it may be preferable to have the wt % of water and the wt % of the strongly ionic group higher than for a monolithic (neat, unsupported) membrane.

The polymer may be cured in a number of ways. Preferably, the polymer is cured thermally, or by radiation ("rad-cure"). Examples of radiation curing methods are gamma and UV irradiation, which can all be used to turn the liquid into a solid polymer. Each technique has its advantages and disadvantages, and selection of the particular irradiation technique will be readily apparent to one skilled in the art. Preferably, the curing is by UV or by thermal means, as it has been found that these lead to polymers with a higher water content.

Once the hydrophilic membrane is cured, (it may or may not be cured onto a material that restricts expansion, i.e. a reinforcement material), the polymer is preferably expanded in water until the desired water content is achieved. It may be expanded in pure water or in acid solution. Further details of how the polymer may be hydrated are given below.

According to one aspect of the present invention, a hydrophilic polymer is provided, which can absorb water such that it forms a hydrated hydrophilic polymer having a water content of at least 65%, wherein water content is as defined herein. Preferably, the membrane is hydrated by soaking in water or acid solution. In another embodiment, the membrane is hydrated by boiling in water or acid solution. In a preferred embodiment, the soaking and/or the boiling is for a duration of at least 15 minutes, more preferably at least 60 minutes. The soaking may be repeated using fresh water/acid up to 3 times. Preferably, after hydration, the membrane may be heated to a temperature of 40-80° C. for up to 24 hours. Preferably, it is followed by another soaking in water/acid.

In a preferred embodiment, the membrane, which is preferably a monolithic (ie. a neat, unsupported) membrane, is boiled in acid for at least 15 minutes.

If acid solution is used to hydrate the membrane the acid is preferably a strong acid (as defined above). Preferably, the strong acid is hydrochloric acid, nitric acid or sulphuric acid. Preferably, the concentration is about 0.1. M.

A polymer of the invention may be used in an MEA, which can in turn be used in a fuel cell or electrolyser. The polymer may be used in non-hydrated form, and then hydrated, in use, during operation of the cell. Alternatively, it may be hydrated prior to use in the cell.

The invention will now be illustrated by the following Example. The Example shows that membranes with the claimed water content have excellent ionic properties, including power densities. Both the supported and the unsupported membranes have comparable ionic properties.

Monolithic Formulation (No Support to Restrict Expansion)

| Component | Composition by Weight, % |
| --- | --- |
| Acrylonitrile | 25-35 |
| Vinylpyrrolidone | 25-35 |
| 2-acrylamido-2-methyl-1-propanesulfonic acid | 15-25 |
| Water | 10-20 |
| Allyl methacrylate | 0.1-1.5 |
| 2-Hydroxy-2-methyl-1-phenyl-propan-1-one | 0.1-0.5 |

15 minute cure time, 1° C., UV Hg bulb.

Composite Membrane Formulation

| Component | Composition by Weight, % |
| --- | --- |
| Acrylonitrile | 10-20 |
| Vinylpyrrolidone | 10-20 |
| 2-acrylamido-2-methyl-1-propanesulfonic acid | 30-40 |
| Water | 30-40 |
| Allyl methacrylate | 0.1-1 |
| 2-Hydroxy-2-methyl-1-phenyl-propan-1-one | 0.1-2 |

15 minute cure time, 1° C., UV Hg bulb.

The Example was repeated for other cure times and temperatures. For example, one membrane was cured for 30 minutes at 50° C.

This liquid should be poured into a thin porous support (typically 50 μm or thinner) which could be made from polythene, polypropylene, or any other suitably porous material. Nippon Sheet Glass, Lydall Solupore, Asahi Kasei, Celgard, Millipore and many other manufacturers make suitable products.

Hydration Method 1

Both polymers can be hydrated using a large volume of deionised water, typically 500 ml for a 100 cm$^2$ membrane. The deionised water is at room temperature. The membrane is allowed to soak in the water for 60 minutes, then the water is drained and replenished with another 500 ml of fresh deionised water. This is repeated one more time, so that the membrane is treated to 3 separate volumes of deionised water at room temperature, for a total of three hours. Next, the membrane is put in an oven at 60° C. for 16 hours. After this period, the water is replenished with room temperature deionised water for the final time. The membrane is ready for use in a fuel cell at this point.

Hydration Method 2

Alternatively, an acidic hydration procedure can be followed to ensure protonation of the sulphonic acid groups in the polymer. The effect of acidification increases with acid strength at the same molarity. So hydrochloric acid at 0.1 M has greater benefit than nitric acid (the weaker acid) at 0.1 M. So, the same procedure as in hydration method 1 can be followed, but with 0.1 M hydrochloric acid used instead of water at the 60° C. stage.

After hydration water contents tend to be in the region of 65-95% water.

Testing

The proton electrolyte membrane fuel cell (PEMFC) consists of the membrane between two electrodes. These electrodes are gas diffusion layers (GDLs): carbon-based with a microporous layer which is coated with platinum black. The highest performance has been recorded using co-flow hydrogen and oxygen gases pressurized to 2 bar gauge, with a maximum cell temperature of 80° C. at peak power. The flow rates are set at a maximum of 1.5 slpm. There is no need for humidification or heating of the reactant gases.

The flow fields are graphite with phenolic impregnation, a commercially available material. The porosity is limited to prevent cell leaks and the graphite has a suitably high conductivity. The active area of the fuel cell is kept relatively small (11.341 cm$^2$) in order to contain current generation within safe limits. The membrane size and active areas can be scaled up as desired.

Figure 2:
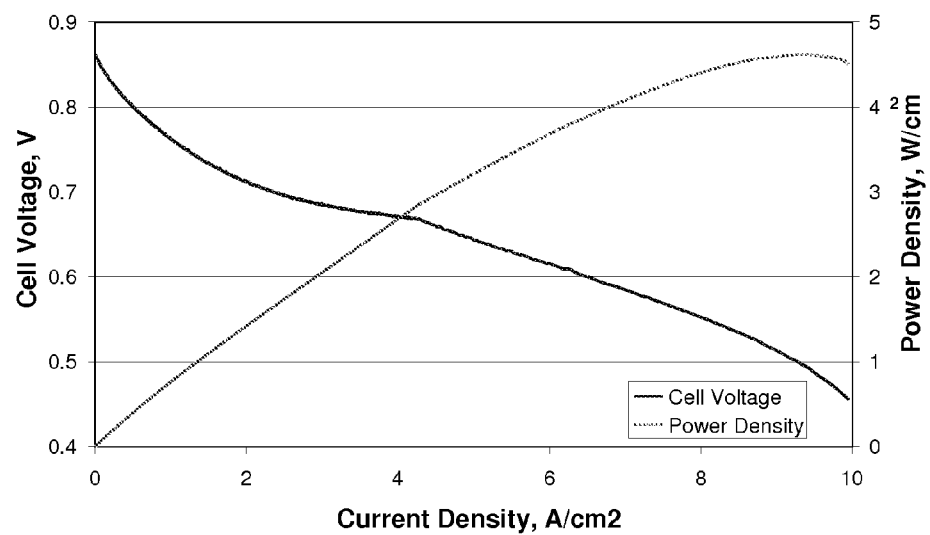

The results are shown in FIGS. 1 and 2.

The invention claimed is:

1. A hydrophilic polymer, which has been hydrated to form a hydrated hydrophilic polymer having a water content of at least 65%, wherein water content is defined as [(mass of the hydrated hydrophilic polymer−mass of the dry hydrophilic polymer)/mass of the hydrated hydrophilic polymer]× 100, and wherein the polymer has been cured by UV radiation,
wherein the hydrophilic polymer is obtainable by the polymerisation of one or more monomers dissolved in water,
wherein the one or more monomers comprises a hydrophilic monomer, a hydrophobic monomer, and an ionic component, and
wherein the ionic component is present in an amount of at least 20% by weight of the total polymerisation mixture.

2. The polymer according to claim 1, which is cross-linked.

3. The polymer according to claim 1, which has anionic sites.

4. The polymer according to claim 1, wherein the hydrophobic monomer is selected from methyl methacrylate (MMA), acrylonitrile (AN), methacryloxypropyltris(trimethylsiloxy)silane (TRIS) and 2,2,2-trifluoroethyl methacrylate (TRIF).

5. The polymer according to claim 1, wherein the hydrophilic monomer is selected from methacrylic acid (MA), 2-hydroxyethyl methacrylate (HEMA), ethyl acrylate (EA), 1-vinyl-2-pyrrolidinone (VP), propenoic acid 2-methyl ester (PAM), monomethacryloyloxyethyl phthalate (EMP) and ammonium sulphatoethyl methacrylate (SEM).

6. The polymer according to claim 1, wherein the ionic component is a strong acid, or a salt thereof.

7. The polymer according to claim 1, wherein the ionic component is selected from toluenesulphonic acid (TSA), 1-methyl-1-benzimidazole-2-sulphonic acid, isethionic acid, Na salt, 1-hexanesulphonic acid, Na salt, hydroxylene-O-sulphonic acid, 2-acrylamido-2-methyl-1-propanesulphonic acid (AMPSA), vinylsulphonic acid (VSA), styrenesulphonic acid (SSA), 2-sulphoethyl methacrylate (SOMA) and 3-sulphopropyl methacrylate, Na salt (SPM).

8. The polymer according to claim 1, wherein the water in the polymerisation mixture is present in an amount of at least 10% by weight of the total polymerisation mixture.

9. The polymer according to claim 1, wherein the hydrated hydrophilic polymer has a water content of at least 90%.

10. A membrane electrode assembly (MEA) comprising the hydrophilic polymer according to claim 1.

11. The MEA according to claim 10, wherein the membrane of the MEA has been polymerised onto a reinforcement material, said reinforcement material limiting the degree of expansion of the membrane in water.

12. The MEA according to claim 11, wherein the reinforcement material comprises a porous material such as polythene.

13. The MEA according to claim 10, wherein the expansion of the membrane of the MEA is not restricted.

14. A fuel cell or electrolyser comprising an MEA according to claim 10.

15. A method of forming the MEA according to claim 10, wherein the method comprises introducing the materials from which the membrane of the MEA is to be formed in between the electrodes of the MEA, and polymerising the membrane in situ.

16. The method according to claim 15, wherein the polymerised membrane is hydrated in situ.

17. The method according to claim 16, wherein the hydration step is carried out while the membrane is operating as part of an electrochemical cell.

18. The method according to claim 15, wherein the electrodes, or any substrate which may be present between the electrodes and the polymerisable materials, does not restrict the degree of expansion of the MEA.

19. A method of forming a polymer, the method comprising polymerisation in water, of a homogenous solution of hydrophobic and hydrophilic monomers and an ionic component, wherein the ionic component is present in an amount of at least 20% by weight, wherein the polymer is hydrated to form a hydrated hydrophilic polymer having a water content of at least 65%, wherein water content is defined as [(mass of the hydrated hydrophilic polymer−mass of the dry hydrophilic polymer)/mass of the hydrated hydrophilic polymer]×100, and wherein the method further comprises curing the polymer by UV radiation.

20. The method according to claim 19, wherein the polymerisation components include a cross-linker, which is present in an amount of less than 5% by weight.

21. The method according to claim 19, wherein the polymer is hydrated to have a water content of at least 90%.

* * * * *